United States Patent
Ong et al.

(10) Patent No.: US 10,620,613 B2
(45) Date of Patent: Apr. 14, 2020

(54) HIGH PERFORMANCE CONTROL SERVER SYSTEM

(71) Applicant: FISHER-ROSEMOUNT SYSTEMS, INC., Round Rock, TX (US)

(72) Inventors: Tiong P. Ong, Austin, TX (US); Kent A. Burr, Round Rock, TX (US); David R. Denison, Austin, TX (US); Godfrey R. Sherriff, Austin, TX (US); Gary Law, Georgetown, TX (US); Brandon Hieb, Cedar Park, TX (US); David M. Smith, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 222 days.

(21) Appl. No.: 15/682,090

(22) Filed: Aug. 21, 2017

(65) Prior Publication Data

US 2019/0056719 A1    Feb. 21, 2019

(51) Int. Cl.
  *G05B 19/418*    (2006.01)
  *G06F 13/40*     (2006.01)
  *G06F 9/50*      (2006.01)

(52) U.S. Cl.
  CPC ....... *G05B 19/4185* (2013.01); *G06F 9/5083* (2013.01); *G06F 13/4068* (2013.01);
  (Continued)

(58) Field of Classification Search
  CPC .................. G05B 19/4185; G06F 13/4068
  See application file for complete search history.

(56) References Cited

U.S. PATENT DOCUMENTS

| 5,796,936 A | 8/1998 | Watabe et al. |
| 6,032,208 A | 2/2000 | Nixon et al. |

(Continued)

FOREIGN PATENT DOCUMENTS

| EP | 2 560 060 A2 | 2/2013 |
| GB | 2 481 753 A | 1/2012 |
| WO | WO-2015/169352 A1 | 11/2015 |

OTHER PUBLICATIONS

U.S. Appl. No. 15/313,372, filed Nov. 22, 2016.
Search Report for Application No. GB1812584.9, dated Jan. 9, 2019.

*Primary Examiner* — Chad G Erdman
*Assistant Examiner* — Kenneth M Lo
(74) *Attorney, Agent, or Firm* — Marshall, Gerstein & Borun LLP

(57) ABSTRACT

Techniques for controlling the operation of a process plant or several process plants within a process control system using a centralized or distributed controller farm allow for increased flexibility in the process control system. Any of the controllers in the controller farm may be utilized to execute modules corresponding to any of the field devices in one or several process plants. Control modules or other operations may be allocated amongst the controllers distributing the load so that one controller is not performing several operations while others are inactive. Additionally, the controller farm may be located in a temperature controlled room or area in an offsite location from the process plants. In some scenarios, load balancing techniques are performed to distribute the load for the modules equally or at least similarly amongst the controllers.

32 Claims, 4 Drawing Sheets

(52) U.S. Cl.
CPC .............. *G05B 2219/31457* (2013.01); *G05B 2219/33334* (2013.01)

(56) References Cited

U.S. PATENT DOCUMENTS

| | | | |
|---|---|---|---|
| 6,098,116 A | 8/2000 | Nixon et al. | |
| 8,230,426 B2 * | 7/2012 | Powers | H04L 67/10 712/28 |
| 8,296,602 B2 * | 10/2012 | Fukuda | G06F 9/4881 714/10 |
| 8,688,831 B2 * | 4/2014 | Schnier | G06F 9/5083 709/201 |
| 2007/0142936 A1 * | 6/2007 | Denison | G05B 13/0275 700/29 |
| 2008/0208361 A1 | 8/2008 | Grgic | |
| 2012/0151878 A1 | 6/2012 | Biehler | |
| 2012/0166514 A1 * | 6/2012 | Mathew | G06F 9/505 709/201 |
| 2012/0167101 A1 * | 6/2012 | Kandula, Sr. | H04L 67/325 718/102 |
| 2016/0020987 A1 * | 1/2016 | Wetterwald | H04L 41/0803 370/252 |
| 2017/0097617 A1 * | 4/2017 | Tegnell | H04L 67/10 |

\* cited by examiner

HIGH PERFORMANCE CONTROL SERVER SYSTEM

FIELD OF THE DISCLOSURE

The present disclosure relates generally to process plants and process control systems, and more particularly, to a centralized or distributed controller farm that controls several field devices distributed across one or several process plants.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa.

Information from the field devices and the controller is usually made available over a communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The communication network utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a communication network to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the communication network), receive data from the controller application via the communication network and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the communication network while a configuration database application may run in a still further computer attached to the communication network to store the current process control routine configuration and data associated therewith. Alternatively, the configuration database may be located in the same workstation as the configuration application.

The architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Furthermore, as mentioned above, process control modules are executed by dedicated distributed controllers, where each controller is communicatively coupled to several proximately located field devices. Each controller is limited to executing control modules for the proximately located field devices and one controller cannot control field devices communicatively coupled to another controller within a different portion of the process plant. The distributed architecture of the controllers may lead to inefficiencies in the process plant as some controllers may be required to perform several operations or tasks while others are inactive or underutilized.

SUMMARY

A process control system within one or several process plants includes a centralized or distributed controller farm having several controllers similar to a server farm. The controller farm may include blade servers or rack servers, where each of the controllers in the controller farm is configured to control each of the field devices in a process plant or in several process plants to control the operation of the process plants. In this manner, the controllers are not limited to controlling a predetermined number of field devices located in proximity with each other in a particular portion of a process plant. A single controller within the controller farm may simultaneously control field devices in several portions of the process plant or in different process plants. Additionally, the same controller may control one set of field devices during a first time interval and another set of field devices in another portion of the process plant during a second time interval. This allows for increased flexibility in the process control system, such that any of the controllers in the controller farm may be utilized to execute control modules or other operations corresponding to any of the field devices in one or several process plants. Control modules or other operations may be allocated amongst the controllers so that one controller is not performing several operations while others are inactive. In some scenarios, the centralized or distributed controller farm is located in a temperature controlled room or area in an offsite location from the process plants.

The controller farm may also include a control manager that assigns control modules and other operations to the controllers. The control manager may be an application included in one of the controllers within the controller farm or may be included within another computing device. For example, the control manager may receive control modules generated via configuration applications and assign the control modules to controllers within the controller farm. Controllers may be assigned control modules based on availability. For example, the control manager may also receive indications of load, bandwidth, available memory, etc. from each of the controllers in the controller farm and may assign control modules and other operations to the controllers based on respective amounts of availability.

DETAILED DESCRIPTION

Figure 1A:
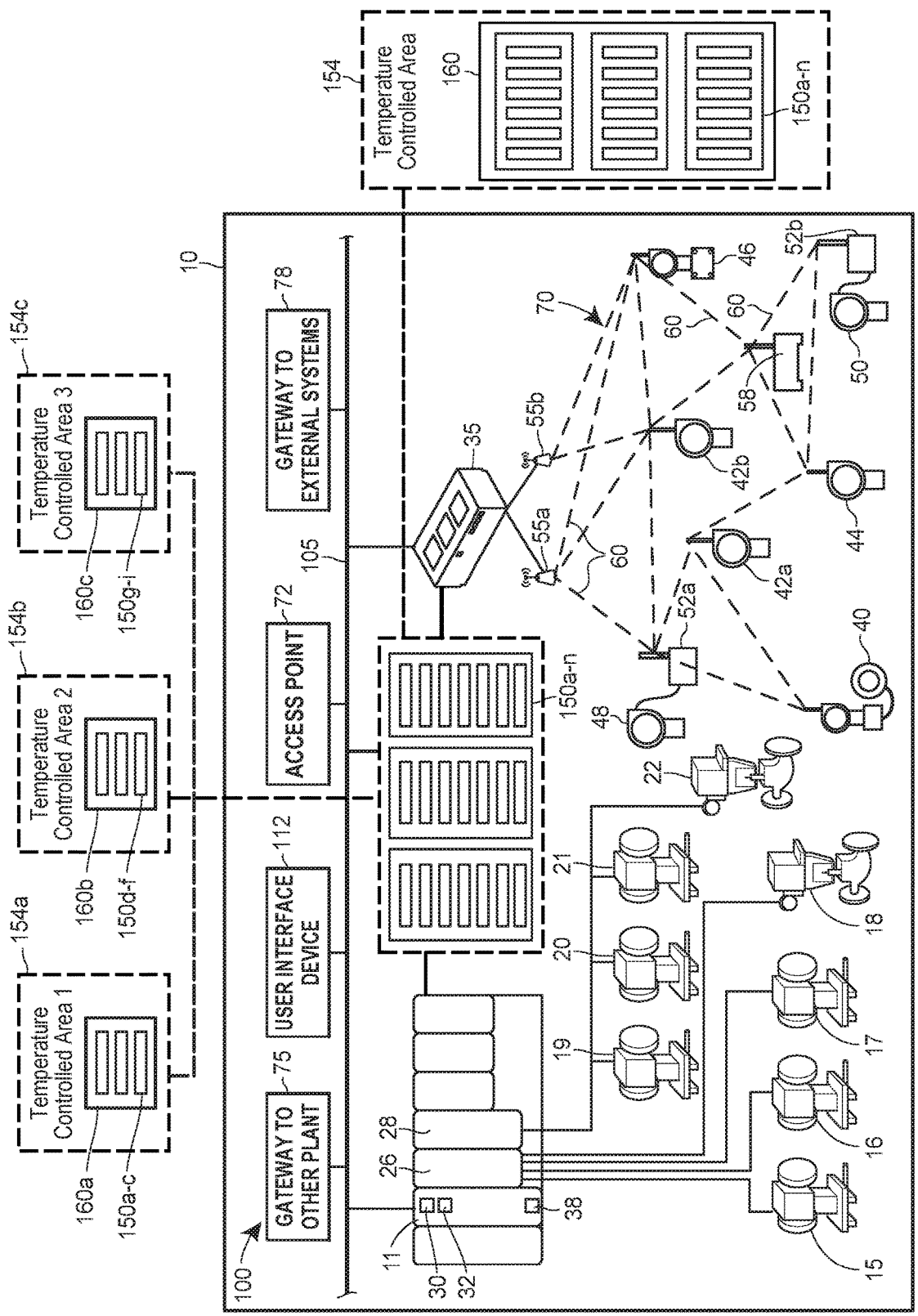
FIG. 1A depicts a block diagram of a process control system including a centralized or distributed controller farm communicatively coupled to field devices in one or more process plants within the process control system.

FIG. 1A is a block diagram of an exemplary process control system 100 operating in a process plant 10. The process control system 100 may include a network backbone 105 providing connectivity directly or indirectly between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), UI devices 112, controllers 150a-n within a controller farm 160, distributed controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52a and 52b, access points 55a and 55b, and routers 58. The wireless adapters 52a and 52b may be connected to non-wireless field devices 48 and 50, respectively. The distributed controller 11 may include a processor 30, a memory 32, and one or more control routines 38. Additionally, each of the controllers 150a-n within the controller farm 160 may include one or more processors, a memory, and one or more control routines, as described in more detail below. Though FIG. 1A depicts only a single one of some of the devices connected to the network backbone 105, it will be understood that each of the devices could have multiple instances on the network backbone 105 and, in fact, that the process plant 10 may include multiple network backbones 105. Additionally, while FIG. 1A depicts a single process plant 10, the process control system 100 may include several process plants 10 having field devices controlled by controllers 150a-n within the controller farm 160. Furthermore, while the controller farm 160 may be located within the process plant 10, the controller farm 160 also may be located offsite in a temperature controlled room or area 154 to prevent the controllers 150a-n from overheating. In other embodiments, the controller farm 160 is a distributed controller farm 160a-160c located in several temperature controlled rooms or areas 154a-c where the distributed controller farm 160a-c is divided into subsets of the controllers 150a-c, 150d-f, and 150g-i. For example, each of the temperature controlled rooms or areas 154a-c may be associated with a different process plant 10. In another example, the temperature controlled rooms or areas 154a-c are in different offsite locations (e.g., different cities, states, countries, etc.).

The UI devices 112 may be communicatively connected to the controller farm 160, the dedicated controller 11, and the wireless gateway 35 via the network backbone 105. The controller farm 160 and the dedicated controller 11 may be communicatively connected to wired field devices 15-22 via input/output (I/O) cards 26 and 28 and may be communicatively connected to wireless field devices 40-46 via the network backbone 105 and a wireless gateway 35. The dedicated controller 11 may operate to implement a batch process or a continuous process using at least some of the field devices 15-22 and 40-46. The dedicated controller 11, which may be, by way of example, the DeltaV™ controller sold by Emerson Process Management, is communicatively connected to the process control network backbone 105.

The controller farm 160 may also operate to implement a batch process or a continuous process using at least one of the controllers 150a-n and some of the field devices 15-22 and 40-46. In some embodiments, the controller farm 160 is communicatively connected to the process control network backbone 105. The dedicated controller 11 and the controller farm 160 may also be communicatively connected to the field devices 15-22 and 40-46 using any desired hardware and software associated with, for example, standard 4-20 mA devices, I/O cards 26, 28 (or an electronic marshaling component electrically connected to the I/O cards 26, 28), and/or any smart communication protocol such as the FOUNDATION® Fieldbus protocol, the HART® protocol, the Wireless HART® protocol, etc. In the embodiment illustrated in FIG. 1A, the dedicated controller 11, the field devices 15-22 and the I/O cards 26, 28 are wired devices, and the controller farm 160 and field devices 40-46 are wireless devices. While the dedicated controller 11 may be communicatively connected to a predetermined set of the field devices 15-22 and 40-46, each of the controllers 150a-n in the controller farm is communicatively connected to each of the field devices 15-22 and 40-46 in the process plant 10 as well as field devices in other process plants within the process control system 100.

In operation of the UI device 112, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, and/or any other data that may be captured and stored), from the controller farm 160. The UI device 112 may receive UI data (which may include display data and process parameter data) via the backbone 105 from other nodes in the process control system 100, such as the distributed controller 11 and the wireless gateway 35. Based on the UI data received at the UI device 112, the UI device 112 provides output (i.e., visual representations or graphics) representing aspects of the process associated with the process control system 100, allowing the user to monitor the process. The user may also affect control of the process by providing input at the UI device 112. To illustrate, the UI device 112 may provide graphics representing, for example, a tank filling process. In such a scenario, the user may read a tank level measurement and decide that the tank needs to be filled. The user may interact with an inlet valve graphic displayed at the UI device 112 and input a command causing the inlet valve to open.

In operation, a user may interact with the UI device 112 to monitor or control one or more devices in the process control system 100, such as any of the field devices 15-22 and 40-46. The user may interact with the UI device 112, for example, to modify or change a parameter associated with a control routine stored in the controller farm 160 or the distributed controller 11. The processor 30 of the distributed controller 11 implements or oversees one or more process control routines (stored in a memory 32), which may include control loops. The processor 30 may communicate with the field devices 15-22 and 40-46 and with other nodes that are communicatively connected to the backbone 105. Similarly, a processor within a controller 150a-n of the controller farm 160 may be selected to implement or oversee one or more process control routines (stored in a memory), which may include control loops. The selected processor may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 100 may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller farm 160 or the distributed controller 11 may be configured (by a user using a UI device 112 in certain embodiments) to implement a control strategy or control routine in any desired manner.

In some embodiments of the UI device 112, a user may interact with the UI device 112 to implement a control strategy at the controller farm 160 or the distributed controller 11 using what are commonly referred to as function blocks, wherein each function block is an object or other part (e.g., a subroutine) of an overall control routine and operates in conjunction with other function blocks (via communications called links) to implement process control loops within the process control system 100. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller farm 160 or the distributed controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller farm 160 or the distributed controller 11 may include one or more control routines 38 that may implement one or more control loops. Each control loop is typically referred to as a control module, and may be performed by executing one or more of the function blocks.

Referring still to FIG. 1A, the wireless field devices 40-46 communicate in a wireless network 70 using a wireless protocol, such as the Wireless HART protocol. In certain embodiments, the UI device 112 may be capable of communicating with the wireless field devices 40-46 using the wireless network 70. Such wireless field devices 40-46 may directly communicate with one or more other nodes of the process control system 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device that may provide access to various wireless devices 40-58 of a wireless communication network 70. In particular, the wireless gateway 35 provides communicative coupling between the wireless devices 40-58 and other nodes of the process control system 100 (including the controller farm 160 and the distributed controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 70. Furthermore, the wireless gateway 35 may provide network management and administrative functions for the wireless network 70, such as resource management, performance adjustments, network fault mitigation, monitoring traffic, security, and the like.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 30. The wireless devices 40-46 and 52-58 may communicate with each other and with the wireless gateway 35 over wireless links 60 of the wireless communication network 70.

Accordingly, FIG. 1A includes several examples of provider devices which primarily serve to provide network routing functionality and administration to various networks of the process control system. For example, the wireless gateway 35, the access points 55a, 55b, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as Wireless HART.

In certain embodiments, the process control system 100 may include other nodes connected to the network backbone 105 that communicate using other wireless protocols. For example, the process control system 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates within the process control system 100 using a wireless access point 72.

Additionally or alternatively, the provider devices may include one or more gateways 75, 78 to systems that are external to the immediate process control system 100. In such embodiments, the UI device 112 may be used to control, monitor, or otherwise communicate with said external systems. Typically, such systems are customers or suppliers of information generated or operated on by the process control system 100. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

Although FIG. 1A illustrates a single distributed controller 11 with a finite number of field devices 15-22 and 40-46, this is only an illustrative and a non-limiting embodiment. Any number of distributed controllers 11 may be included in the provider devices of the process control system 100, and any of the distributed controllers 11 may communicate with any number of wired or wireless field devices 15-22, 40-46 to control a process in the plant 10. Furthermore, the process plant 10 may also include any number of wireless gateways 35, routers 58, access points 55, wireless process control communication networks 70, access points 72, and/or gateways 75, 78. Although FIG. 1A illustrates a controller farm 160 having a particular number of controllers 150a-n, any number of controllers 150a-n may be included in the controller farm 160 including tens of controllers, hundreds of controllers, thousands of controllers, etc.

As used herein, a "distributed" controller may be communicatively connected to a subset of the field devices 15-22, 40-46 in the process plant 10 to control the operation of at least a portion of the process plant. A distributed controller may be proximately located to the respective field devices 15-22, 40-46 that are controlled by the distributed controller (e.g., within the same area of the process plant 10 as the field devices 15-22, 40-46).

Also as used herein, a "controller farm" or a "centralized or distributed controller farm" may include several controllers each communicatively connected to each of the field devices 15-22, 40-46 in the process plant 10 and/or field devices in other process plants within the process control system 100. The centralized or distributed controller farm may be remotely located from the respective field devices 15-22, 40-46 that are controlled by the centralized or distributed controller farm (e.g., in a different area of the process plant 10 from the field devices 15-22 such as a temperature controlled area or offsite from the process plant 10). Each of the controllers may be configured to execute control modules for each of the field devices 15-22, 40-46 in the process plant 10 and/or field devices in other process plants within the process control system 100. For example, each of the controllers may be configured to execute the same control module for the same field device or subset of field devices. One of the controllers within the controller farm may be selected to execute the control module by providing control signals to a subset of the field devices 15-22, 40-46 at a particular time interval. The controller may later be selected to execute another control module by providing control signals to another subset of the field devices 15-22, 40-46 at another time interval. In some scenarios, the controllers are in a centralized controller farm and are located within the same area (e.g., a temperature controlled room). In other scenarios, the controllers are in a distributed controller farm and are located in several areas (e.g., several temperature controlled rooms).

A process control system 100 may include both distributed controllers and a controller farm, where the distributed controllers and the controllers within the controller farm provide different types of control. For example, the distributed controllers may execute control modules while the controllers within the controller farm provide supervisory control (e.g., changing setpoints, executing big data modules to perform analytics, etc.). In another example, the distributed controllers execute control modules and provide an alert or other signal to the controller farm if there are issues with the control. Then the controllers within the controller farm may execute the control modules in place of the distributed controllers.

Figure 1B:
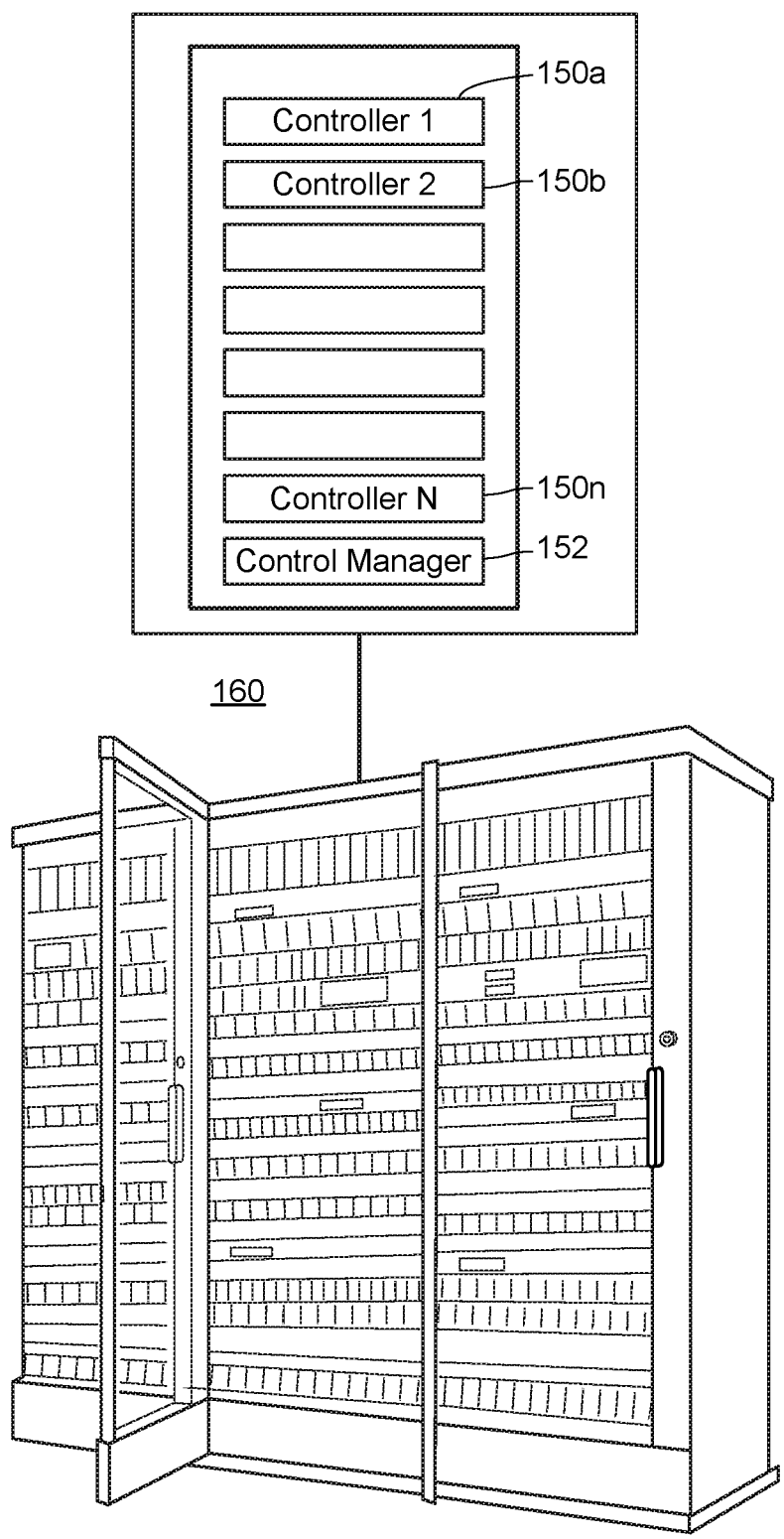
FIG. 1B illustrates an example architecture of the centralized or distributed controller farm which may communicate with the process control system of FIG. 1A.

Turning now to FIG. 1B, the controller farm 160 may include one or several blade servers each having several blades 150a-n, 152 that include controllers 150a-n and a control manager 152. Each of the blades 150a-n, 152 may be a thin electronic circuit board having one or more processors and a memory similar to the distributed controller 11. The processors within each of the blades 150a-n, 152 may include multi-core hardware, such as a multi-core processor or another type of parallel processor. Additionally, the memory within each of the blades 150a-n, 152 may include high density memory storage technology, for example, solid state drive memory, semiconductor memory, optical memory, molecular memory, biological memory, or any other suitable high density memory technology. In some embodiments, the memory storage may also include flash memory. The memory storage (and, in some cases, the flash memory) may be configured to temporarily store or cache data that is generated by, received at, or otherwise observed by the respective blade 150a-n, 152.

The blades 150a-n also referred to herein as "controllers" (e.g., controller 1, controller 2, . . . controller N) are communicatively connected to each of the field devices 15-22, 40-46 in the process plant 10 and/or field devices in other process plants within the process control system 100. In some embodiments, the blades 150a-n are communicatively connected to each of the field devices 15-22, 40-46 via electronic marshaling components (e.g., a CHARacterization Module or CHARM provided by Emerson Process Management). The electronic marshaling components may be included in an electronic marshaling block or apparatus such as a CHARM carrier that supports one or more CHARM I/O cards and individually configurable channels (CHARMs). In some embodiments, the blades 150a-n wirelessly communicate with the CHARM I/O cards via the network backbone 105, wireless gateway 35, or any other suitable communication network. A CHARM I/O card then communicates with a CHARM that is communicatively connected (e.g., in a wired or wireless manner) to a field device 15-22, 40-46.

In any event, each controller 150a-n includes control routines or modules that correspond to a subset of the field devices 15-22, 40-46 to control at least a portion of the process. While several controllers 150a-n within the controller farm 160 may provide control signals to the same subset of field devices 15-22, 40-46, multiple controllers 150a-n may not provide control signals to the same field device and/or for the same parameters within the same time interval. For example, a first controller 150a and a second controller 150b may not provide control signals to the same valve instructing the valve to open or close within the same time interval. In some embodiments, the control manager 152 assigns control modules to the controllers 150a-n such that multiple controllers 150a-n cannot provide control signals to the same field device and/or for the same parameters within the same time interval. Additionally or alternatively, a control monitor module within the controller farm 160 may monitor the control outputs from the controllers 150a-n to determine whether any two control outputs are going to the same field device and/or are for the same parameter within the same time interval. When this occurs, the control monitor module may override the control signals to ensure that only one of the control signals is provided to the field device. The control monitor module may also provide a request to one of the controllers 150a-n or to the control manager 152 to stop providing control signals to the field device during the time interval. However, multiple controllers 150a-n may receive outputs from the same field device within the same time interval, such as the valve opening percentage from the same valve.

In some embodiments, for each of the control routines or modules executed by the controllers 150a-n, one of the controllers 150a-n may include a redundancy module. The redundancy module may cause the controller 150b executing the redundancy module to stay in sync with the controller 150a executing the control module, so that the controller 150b executing the redundancy module is available to take over and execute the control module if the controller 150a currently executing the control module fails. To stay in sync with the controller 150a executing the control module, the redundancy module may cause the controller 150b executing the redundancy module to receive the same inputs, outputs, setpoints, etc. being received and provided by the controller 150a executing the control module. The controller 150a executing the control module may be a different controller or blade than the controller or blade 150b executing the redundancy module. Similar to the control modules, the redundancy modules may be software, firmware, hardware, etc. Redundancy modules may be implemented in any desired software format, such as using object oriented programming, ladder logic, sequential function charts, function block diagrams, or using any other software programming language or design paradigm.

Also in some embodiments, each controller 150a-n includes big data modules that correspond to a subset of the field devices 15-22, 40-46 to collect and store process control data from the process plant 10, including sensor data, control parameters, time stamps associated with the data, or any other type of data available in the process plant. This may include measurement data, configuration data, batch data, event data, and/or continuous data, such as real-time process data that is generated while a process is being controlled in the process plant 10 corresponding to configurations, batch recipes, setpoints, outputs, rates, control actions, diagnostics, alarms, events and/or changes thereto.

The big data modules may also analyze the collected process control data to develop and/or use models, recognize data trends and/or correlations, alert plant personnel to actual or predicted problems or abnormal situations and/or sub-optimal conditions that may be affecting or will soon affect the process plant 10, etc. In some embodiments, a big data module performs these functions without being programmed specifically to associate a particular set of data or trends with a particular problem or condition and, instead, recognizes that a current trend or data concurrence has occurred before at or around the time of a previous condition (which could be a positive/desirable condition or a negative/undesirable condition). From the recognition of the prior occurrence of the trend or data concurrence, the big data module may predict the condition ("pro-nostics"). The big data modules may also determine from the collected process control data which process variables, sensor readings, etc. are most important in detecting, predicting, preventing and/or correcting an abnormal situation in the process plant 10. For example, a big data module may determine that a trend indicated by a series of previous data points indicates a predicted abnormal situation, a predicted maintenance concern, a predicted failure, etc.

Similar to the control modules, the big data modules may be software, firmware, hardware, etc. Big data modules may be implemented in any desired software format, such as using object oriented programming, ladder logic, sequential function charts, function block diagrams, or using any other software programming language or design paradigm.

In addition to the controllers 150a-n, the controller farm 160 includes a control manager 152 that assigns control modules, redundancy modules, big data modules, and any other suitable operations to the controllers 150a-n. In some embodiments, the control manager 152 is implemented in hardware and is one of the blades within the blade servers. In other embodiments, the control manager 152 is a software application that may be implemented in any of the blades 150a-n, 152 in the controller farm 160 and a controller 150a may include a control manager application in addition to the control modules, redundancy modules, big data modules, etc. However, throughout this description the control manager 152 may be referred to herein as a hardware device within the controller farm 160, such as a blade of a blade server. The controller farm 160 may include a single control manager 152 implemented on a single blade that manages control for each of the controllers within several blade servers in the controller farm 160. In other embodiments, the control manager 152 is implemented across several blades. In yet other embodiments, the controller farm 160 includes one or several rack servers each having several mounting slots referred to as bays 150a-n, 152.

In other embodiments, the controller farm 160 includes cloud servers in a cloud computing environment, fog servers in a fog computing environment, where the fog computing environment is for example hosted by the organization that operates the process plant(s) 10 within the process control system 100, or any suitable combination of these. For example, while a cloud computing environment may include controllers that control processes in process plants 10 throughout the United States or even the world, the fog computing environment may include controllers that control processes in process plants 10 owned and operated by a particular organization or process plants 10 in a particular city or town.

Figure 2:
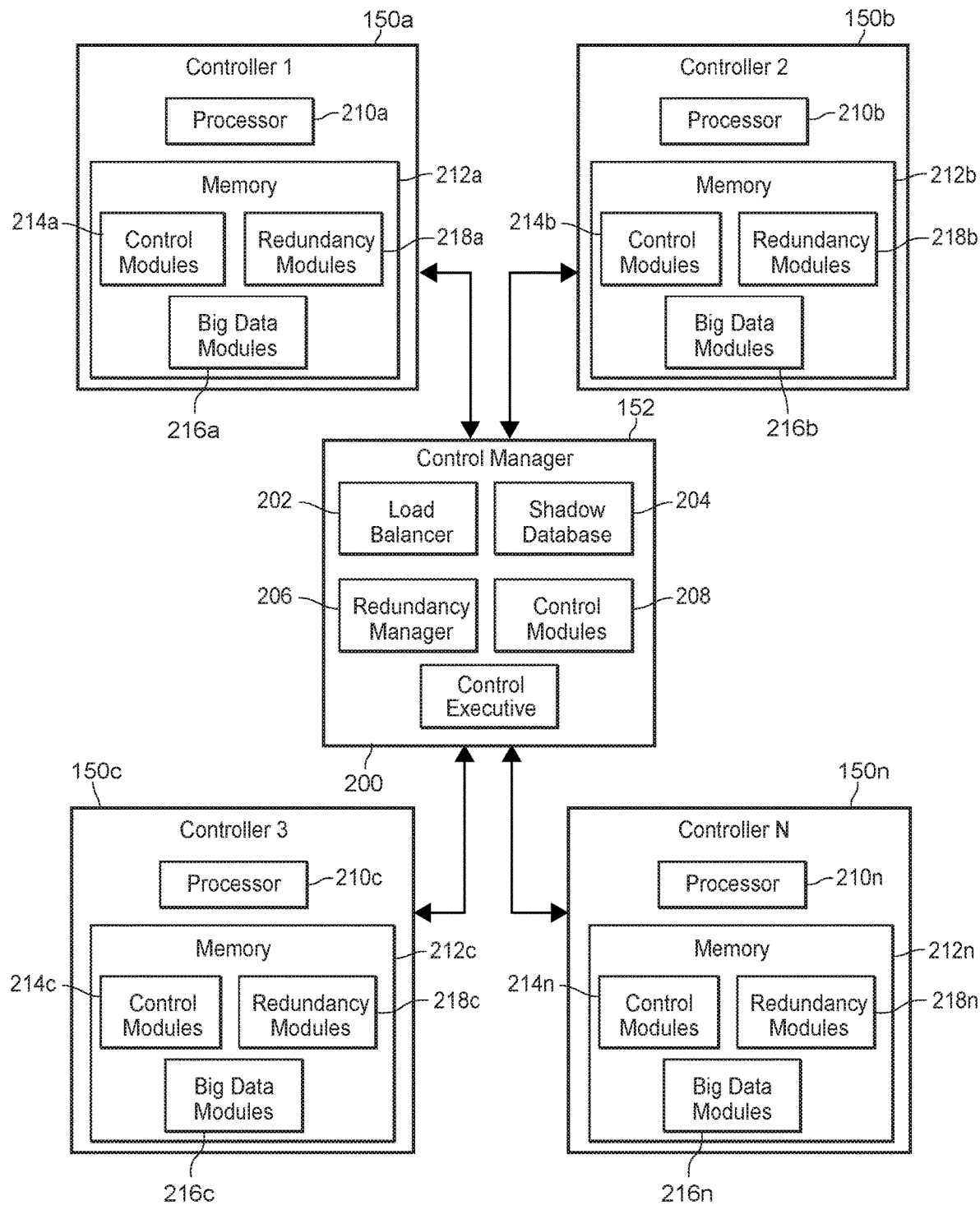
FIG. 2 illustrates a block diagram of an example control manager computing device and several controllers in the centralized or distributed controller farm of FIG. 1B.

In any event, the control manager 152 may obtain control modules, redundancy modules, big data modules, etc. from configuration applications generated at one or several UI devices 112. In some embodiments, the control manager 152 automatically generates a redundancy module upon obtaining a corresponding control module. Referring now to FIG. 2, the control manager 152 communicates with several controllers 150a-n in the controller farm 160. Each of the controllers 150a-n and the control manager 152 may be physical machines (e.g., hardware) or virtual machines (e.g., software). In this manner, a blade of the controller farm 160 may host several guest virtual machines or controllers. In any event, the control manager 152 includes a control executive 200, a load balancer 202, a shadow database 204, a redundancy manager 206, control modules 208, and big data modules (not shown). Each of the controllers 1-N (ref. nos. 150a-n) includes a processor 210a-n, such as a multi-core processor or another type of parallel processor and a memory 212a-n which may be a high density memory. Each of the memories 212a-n may store various routines assigned to the respective controller 150a-n, including control modules 214a-n, big data modules 216a-n, and redundancy modules 218a-n.

In addition to storing and executing routines to control and monitor operations within the process plant 10, the controllers 150a-n may provide indications of availability to the control manager 152. In some embodiments, each of the controllers 150a-n provides an availability metric for a particular time interval to the control manager 152 based on the load at the controller 150a-n, the available amount of memory at the controller 150*a-n*, and bandwidth for transmitting data from the controller 150*a-n* at the particular time interval. In other embodiments, each of the controllers 150*a-n* provides indications of the load at the controller 150*a-n*, the available amount of memory at the controller 150*a-n*, and bandwidth for transmitting data from the controller 150*a-n* for a particular time interval. The control manager 152 then determines an availability metric for the particular time interval for each controller 150*a-n* based on this information. The load at the controller 150*a-n* may indicate the amount of processing being performed by the controller 150*a-n* as well as the processing capabilities of the controller 150*a-n* (e.g., single core, dual core, quad-core, etc.).

The control executive 200 at the control manager 152 may receive operations to be performed by the controllers 150*a-n* in the controller farm 160, such as control modules 208, redundancy modules, big data modules, etc. from configuration applications generated at one or several UI devices 112 or from other applications or devices within the process control system 100. In some embodiments, the redundancy manager 206 generates a redundancy module for each control module 208 obtained by the control manager 152. The redundancy module may cause the controller 150*a-n* executing the redundancy module to receive the same inputs, outputs, setpoints, etc. being received and provided by the controller 150*a-n* executing the control module without executing the control loops or functions included in the control module. In some embodiments, the control executive 200 provides each of the obtained control modules 208 to the redundancy manager 206 for the redundancy manager to generate a corresponding redundancy module.

Also in some embodiments, the control executive 200 assigns a priority level to each of the control modules 208, redundancy modules, and big data modules and ranks the modules in order of priority. Priority levels may be assigned automatically based on a predetermined set of priority rules (e.g., a redundancy module has the same priority level as a corresponding control module, control modules have higher priority levels than big data modules, etc.). Additionally or alternatively, a user may assign the priority level for each of the modules. For example, when a configuration engineer generates a control module via a configuration application, the configuration engineer may also assign a priority level for the control module.

The control executive 200 may communicate with the load balancer 202 to determine which controller 150*a-n* should execute which control modules 208, redundancy modules, and big data modules during a particular time interval. In some embodiments, the load balancer 202 receives an availability metric for each of the controllers 150*a-n* in the controller farm 160 and a list of control modules, redundancy modules, and big data modules to be executed within a particular time interval (e.g., 30 minutes, an hour, two days, a day, etc.) which may include respective priority levels for each of the modules. The load balancer 202 then assigns a controller 150*a-n* in the controller farm 160 to execute each of the modules. In some scenarios, a single controller 150*a-n* may execute several modules within the same time interval depending on the parallel processing capabilities and memory density of the controller 150*a-n*. In another example scenario, the load balancer 202 identifies two different controllers 150*a-n* to execute a control module and a redundancy module, so that the controller 150*a-n* executing the redundancy module can take over for the controller 150*a-n* executing the control module in the event of a failure at the controller.

In some embodiments, the load balancer 202 identifies characteristics of each of the modules, such as whether each module is executed periodically or based on the occurrence of an event (event driven), the execution time for each module, or any other suitable characteristics. Then the load balancer 202 identifies controllers 150*a-n* to execute the modules based on the availability metrics for the controllers 150*a-n* and the priority levels and characteristics of the modules. More specifically, the load balancer 202 uses a load balancing algorithm to assign controllers 150*a-n* to execute the modules.

For example, the load balancer 202 may rank each of the controllers 150*a-n* according to their respective availability metrics, where the controller 150*a-n* having the highest availability metric has the greatest amount of availability and is ranked highest. The load balancer 202 may also rank each of the modules based on a combination of the priority level and characteristics for each module. In some embodiments, periodic modules are ranked above event driven modules, then each of the periodic modules are categorized based on priority level and each of the event driven modules are categorized based on priority level. Each of the periodic modules in the high priority category may be ranked above each of the periodic modules in the medium priority category and so on. Periodic or event driven modules in the same priority category may be further ranked based on execution time. More specifically, when there are three priority categories (high, medium, and low), and periodic and event driven modules, the high priority periodic modules may be ranked first where each module in this category is further ranked in order of execution time, followed by the medium priority periodic modules, followed by the low priority periodic modules, followed by the high priority event driven modules, etc.

Accordingly, the load balancer 202 may rank the controllers 150*a-n* and may rank the modules. While the controllers 150*a-n* are ranked in the above example in order of availability metrics and the modules are ranked in order of priority levels and module characteristics, the controllers 150*a-n* and modules may be ranked in any suitable manner.

Then the load balancer 202 may use a reversing round-robin mechanism to first assign the highest ranked module (e.g., a high priority periodic module having the longest execution time) to the highest ranked controller 150*a-n* (e.g., the controller having the highest availability metric). The second highest ranked module may be assigned to the second highest ranked controller 150*a-n* and the algorithm may continue in this manner until the lowest ranked controller 150*a-n* is assigned a module. If there are more modules to assign, the load balancer 202 continues to assign modules in reverse order. For example, the load balancer 202 also assigns the next module to the lowest ranked controller 150*a-n* and then assigns the module ranked below the next module to the second lowest ranked controller 150*a-n* and continues in increasing order until the highest ranked controller 150*a-n* is assigned two modules. Then the load balancer 202 once again reverses the order to assign modules in decreasing order and continues in the reversing round robin manner until each of the modules are assigned to controllers 150*a-n*.

While the load balancer 202 may rank the controllers 150*a-n* and the modules and use a reversing round-robin mechanism to assign modules to controllers 150*a-n*, the load balancer 202 may assign modules to controllers 150*a-n* in any suitable manner to distribute the modules amongst the controllers 150*a-n* in the controller farm 160. In other embodiments, the modules are distributed equally or at least similarly amongst the controllers 150*a-n* regardless of priority level or characteristics. In yet other embodiments, the load balancer 202 assigns modules to the same controller 150*a* until the processing at the controller 150*a* reaches capacity. Then the load balancer 202 assigns modules to another controller 150*b* until the processing at the other controller 150*b* reaches capacity and the load balancer 202 may continue to assign modules in this manner.

In any event, the control executive 200 then provides the assigned modules to the corresponding controllers 150*a-n*, so that each controller 150*a-n* may execute the assigned modules. In some embodiments, the control executive 200 analyzes the assignments and may adjust some of the assignments to ensure that multiple controllers 150*a-n* are not providing control signals to the same field device and/or for the same parameter within the same time interval.

In an exemplary scenario, during a first time interval a controller 150*a* may be assigned a first set of modules including control modules, big data modules, and redundancy modules. The control executive 200 may download the control modules 214*a*, big data modules 216*a*, and redundancy modules 218*a* to the controller 150*a* during the first time interval. Then during a second time interval, the controller 150*a* may be assigned a second set of modules different from the first set of modules. The control executive 200 may download the control modules 214*a*, big data modules 216*a*, and redundancy modules 218*a* to the controller 150*a* during the second time interval.

In another exemplary scenario, during a particular time interval the control manager 152 assigns a first control module to a first controller 150*a*, where the first control module corresponds to a first subset of the field devices 15-22, 40-46. The control manager 152 assigns a second control module to a second controller 150*b*, where the second control module corresponds to a second subset of the field devices 15-22, 40-46. The first and second subsets of the field devices 15-22, 40-46 may be located in different areas of the same process plant 10 or in different process plants 10. The first controller 150*a* then executes the first control module and the second controller 150*b* executes the second control module within the same time interval. During a later time interval, the first controller 150*a* is no longer assigned the first control module and the second controller 150*b* is assigned both the first and second control modules. For example, the first controller 150*a* may not have the processing resources to execute the first control module during the later time interval. The second controller 150*b* then executes the first and second control modules for the first and second subsets of the field devices 15-22, 40-46, respectively during the later time interval.

In some embodiments, periodic modules remain assigned to the same controller 150*a-n* for several time intervals, whereas event driven modules are reassigned to the controllers 150*a-n* for each time interval based on the availability metrics of the controllers 150*a-n* at the particular time interval. In other embodiments, each of the control modules 208, big data modules, and redundancy modules are downloaded to each of the controllers 150*a-n* prior to execution (e.g., when the modules are generated) and stored in their respective memories 212*a-n*. When the control executive 200 selects a controller 150*a* to execute a particular module, the control manager 152 provides an indication of the particular module to the selected controller 150*a* and the selected controller 150*a* retrieves the particular module from memory 212*a* and executes the particular module.

In some embodiments, the control manager 152 includes a shadow database 204 that stores input data for the control modules 208, redundancy modules, and big data modules. Input data for the modules may be obtained from UI devices 112 when the modules are generated via a configuration application, for example. The input data may also be obtained from the controllers 150*a-n* when the controllers 150*a-n* execute the control modules 214*a-n* and the big data modules 216*a-n*. Outputs from the control modules 214*a-n* and the big data modules 216*a-n* may be received at the shadow database 204 from the controllers 150*a-n* and stored as input data for control modules 208, redundancy modules, and big data modules executed during subsequent time intervals.

Figure 3:
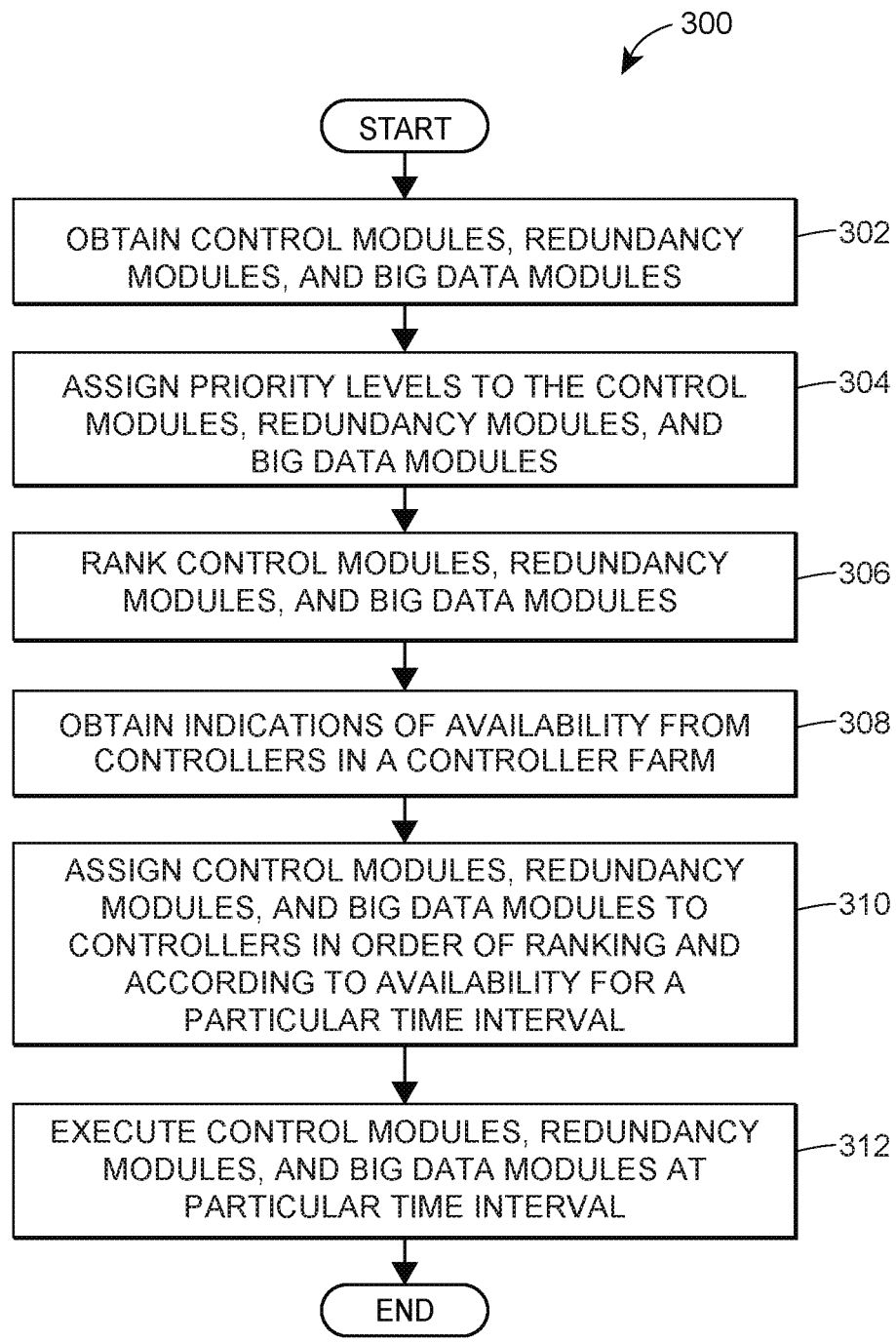
FIG. 3 is a flow diagram representing an exemplary method for load balancing controllers in a process control system.

FIG. 3 depicts a flow diagram representing an exemplary method 300 for load balancing between controllers in a process control system 100. The method 300 may be executed on the control manager 152 within the controller farm 160 or any other computing device, blade server, etc. within the controller farm 160 or in communication with the controller farm 160. In some embodiments, the method may be implemented in a set of instructions stored on a non-transitory computer-readable memory and executable by one or more processors of the control manager 152.

At block 302, control modules, redundancy modules, and big data modules are obtained. For example, the modules may be obtained from UI devices 112 via configuration applications. In some embodiments, the control modules are obtained and a redundancy module is automatically generated for each control module so that a controller executing the redundancy module receives the same inputs, outputs, setpoints, etc. being received and provided by the controller executing the control module.

Priority levels are then assigned to each of the control modules, redundancy modules, and big data modules (block 304). The priority levels may be numeric priority levels (e.g., 1, 2, 3) may be a category from a set of categories (e.g., high, medium, low) or may be any suitable indications of priority. In some embodiments, the priority levels are assigned by users for example, at the time the modules are created via configuration applications. In other embodiments, the priority levels are assigned automatically based on a predetermined set of priority rules (e.g., a redundancy module has the same priority level as a corresponding control module, control modules have higher priority levels than big data modules, etc.).

Then at block 306, each of the control modules, redundancy modules, and big data modules are ranked. In some embodiments, the modules are ranked in order of priority level. The modules may be further ranked according to module characteristics, such as whether each module is executed periodically or based on the occurrence of an event (event driven), the execution time for each module, or any other suitable characteristics. For example, periodic modules may be ranked above event driven modules and the periodic modules may be further ranked according to priority level. The event driven modules may also be further ranked according to priority level. Then each of the periodic modules having the highest priority level may be ranked according to execution time, where the periodic modules having the highest priority level and longest execution time is ranked highest. In other embodiments, the modules may be ranked using any suitable combination of priority level and module characteristics or in any suitable manner.

Indications of availability are obtained for each of the controllers 150*a-n* in the controller farm 160 for a particular time interval (block 308). For example, each controller 150*a-n* may generate an availability metric for the particular time interval based on the load at the controller 150*a-n*, the available amount of memory at the controller 150*a-n*, and bandwidth for transmitting data from the controller 150*a-n* at the particular time interval. The controllers 150*a-n* may then provide the respective availability metrics to the control manager 152. In another example, each controller 150*a-n* may provide indications of the load at the controller 150*a-n*, the available amount of memory at the controller 150*a-n*, and bandwidth for transmitting data from the controller 150*a-n* for the particular time interval. The control manager 152 then determines the availability metric for the particular time interval for each controller 150*a-n* based on this information.

In some embodiments, the control manager 152 ranks each of the controllers 150*a-n* based on the availability metrics for the particular time interval. For example, the controller 150*a-n* having the highest availability metric and therefore the greatest amount of availability is ranked highest. The controllers 150*a-n* are then ranked in descending order of availability.

At block 310, the control modules, redundancy modules, and big data modules are assigned to the controllers 150*a-n*. To balance the load amongst the controllers 150*a-n* within the controller farm 160, the control manager 152 may distribute the control modules, redundancy modules, and big data modules across each of the controllers 150*a-n*. In some embodiments, the control manager 152 uses a load balancing algorithm to assign modules to the controllers 150*a-n*. For example, the load balancing algorithm may be a reversing round robin mechanism, where the control manager 152 assigns the highest ranked module to the highest ranked controller 150*a-n*, then assigns the second highest ranked module to the second highest ranked controller 150*a-n* and continues in descending order until each controller 150*a-n* has been assigned a module. Then the control manager 152 assigns the remaining control modules in ascending order for the controllers 150*a-n* until each controller 150*a-n* has been assigned two modules. The control manager 152 alternates the order in which controllers 150*a-n* are assigned modules until each of the modules have been assigned.

In another example, the control manager 152 assigns the highest ranked module to the highest ranked controller 150*a-n*, then assigns the second highest ranked module to the second highest ranked controller 150*a-n* and continues in descending order until each controller 150*a-n* has been assigned a module. Then the control manager 152 assigns the next ranked module to the highest ranked controller 150*a-n* and continues in descending order of the controllers 150*a-n* once again and repeats this process until each of the modules have been assigned.

In yet another example, the control manager 152 randomly selects the order in which controllers 150*a-n* are assigned modules and then assigns modules to the controllers 150*a-n* according to the randomly selected order. In another example, the control manager 152 assigns modules in descending order to the highest ranked controller 150*a-n* until the highest ranked controller 150*a-n* reaches full capacity. Then the control manager 152 assigns the next ranked modules in descending order to the second highest ranked controller 150*a-n* until the second highest ranked controller 150*a-n* reaches full capacity and continues in this manner until each of the modules have been assigned. While these are merely a few examples in which modules may be assigned to controllers 150*a-n*, the modules may be assigned in any suitable manner.

At block 312, the assigned modules are downloaded to the respective controllers 150*a-n* for execution during the particular time interval. Each controller 150*a-n* executes its assigned modules by providing control signals and otherwise communicating with the field devices 15-22, 40-46 associated with each assigned module.

Embodiments of the techniques described in the present disclosure may include any number of the following aspects, either alone or combination:

1. A process control system comprising: a plurality of field devices each configured to perform a physical function to control at least a portion of a process in the process control system; and a plurality of controllers in a controller farm each communicatively coupled to each of the plurality of field devices and each of the plurality of controllers configured to execute a same control module corresponding to the plurality of field devices to control the process by transmitting control signals to the plurality of field devices corresponding to the physical functions, wherein one of the plurality of controllers is selected to execute the control module for a particular time interval.

2. The process control system according to aspect 1, wherein the controller farm is located in a temperature controlled area.

3. The process control system according to any one of the preceding aspects, wherein the plurality of field devices is a first plurality of field devices and further comprising a second plurality of field devices, and wherein each of the plurality of controllers are configured to execute a first control module corresponding to the first plurality of field devices and a second control module corresponding to the second plurality of field devices, wherein a first controller is selected to execute the first control module and a second controller is selected to execute the second control module at the particular time interval.

4. The process control system according to any one of the preceding aspects, wherein the first plurality of field devices and the second plurality of field devices are located within a same process plant.

5. The process control system according to any one of the preceding aspects, wherein the first plurality of field devices and the second plurality of field devices are located within different process plants.

6. The process control system according to any one of the preceding aspects, wherein at another time interval the first controller does not execute the first control module and the second controller executes the first control module and the second control module.

7. The process control system according to any one of the preceding aspects, wherein the second controller executes a redundancy module corresponding to the first control module.

8. The process control system according to any one of the preceding aspects, wherein each of the plurality of controllers in the controller farm communicate with each the plurality of field devices via an input/output (I/O) device communicatively coupled to the respective field device.

9. The process control system according to any one of the preceding aspects, wherein the selected controller is further configured to obtain and store data corresponding to the process including at least one of: configuration data, continuous data, and event data corresponding to the process.

10. The process control system according to any one of the preceding aspects, further comprising: a computing device communicatively coupled to the plurality of controllers configured to assign control modules for each of the plurality of controllers to execute at particular time intervals.

11. The process control system according to any one of the preceding aspects, wherein the computing device obtains indications of load, bandwidth, and available memory from each of the plurality of controllers and assigns control modules, redundancy modules, and big data modules to the plurality of controllers according to at least one of the load, bandwidth, or available memory for each controller.

12. The process control system according to any one of the preceding aspects, wherein the computing device is one of the plurality of controllers within the controller farm.

13. The process control system according to any one of the preceding aspects, wherein the computing device obtains a plurality of control modules to be executed by the plurality of controllers and ranks the plurality of control modules according to assigned priority levels.

14. The process control system according to any one of the preceding aspects, wherein the computing devices assigns control modules to the plurality of controllers in order of the respective rankings of each of the plurality of control modules, wherein the highest ranked control module is assigned first.

15. A method for controlling a plurality of field devices in one or more process plants within a process control system via a controller farm, the method comprising: transmitting, by a plurality of controllers in a controller farm, control signals to a plurality of field devices each configured to perform a physical function to control at least a portion of a process in the process control system, wherein each of the plurality of controllers is configured to execute a same control module corresponding to the plurality of field devices to control the process; selecting one of the plurality of controllers to execute the control module for a particular time interval; and transmitting, by the selected controller, control signals to the plurality of field devices in accordance with the control module during the particular time interval.

16. The method according to aspect 15, wherein the controller farm is located in a temperature controlled area.

17. The method according to either one of aspect 15 or of aspect 16, wherein the plurality of field devices is a first plurality of field devices, wherein each of the plurality of controllers are configured to execute a first control module corresponding to the first plurality of field devices and a second control module corresponding to a second plurality of field devices and further comprising: selecting a first controller to execute the first control module at the particular time interval; transmitting, by the first controller, control signals to the first plurality of field devices in accordance with the first control module during the particular time interval; selecting a second controller to execute the second control module at the particular time interval; and transmitting, by the second controller, control signals to the second plurality of field devices in accordance with the second control module during the particular time interval.

18. The method according to any one of aspects 15-17, wherein the first plurality of field devices and the second plurality of field devices are located within a same process plant.

19. The method according to any of aspects 15-18, wherein the first plurality of field devices and the second plurality of field devices are located within different process plants.

20. The method according to any of aspects 15-19, wherein at another time interval the first controller does not execute the first control module and further comprising: transmitting, by the second controller, control signals to the first plurality of field devices in accordance with the first control module during the other time interval.

21. The method according to any of aspects 15-20, further comprising: executing, by the second controller, a redundancy module corresponding to the first control module.

22. The method according to any of aspects 15-21, further comprising: obtaining and storing, by the selected controller, data corresponding to the process including at least one of: configuration data, continuous data, and event data corresponding to the process.

23. The method according to any of aspects 15-22, wherein a computing device communicatively coupled to the plurality of controllers selects controllers to execute control modules at particular time intervals.

24. The method according to any of aspects 15-23, further comprising: obtaining, by the computing device, indications of load, bandwidth, and available memory from each of the plurality of controllers; and assigning control modules, redundancy modules, and big data modules to the plurality of controllers according to at least one of the load, bandwidth, or available memory for each controller.

25. The method according to any of aspects 15-24, wherein the computing device is one of the plurality of controllers within the controller farm.

26. A method for load balancing control modules in a process control system, the method comprising: obtaining a plurality of control modules that control a process in the process control system via control signals provided to field devices configured to perform physical functions within the process control system; obtaining an availability metric from each of a plurality of controllers in a controller farm communicatively coupled to the field devices; and assigning each of the plurality of control modules to one of the plurality of controllers to execute the respective control module at a particular time interval based on the availability metrics.

27. The method according to aspect 26, wherein obtaining the availability metric for one of the plurality of controllers includes identifying the availability metric based on indications of load, bandwidth, and available memory for the controller.

28. The method according to either one of aspect 26 or of aspect 27, further comprising: assigning each of one or more redundancy modules and one or more big data modules to one of the plurality of controllers to execute the respective redundancy module or big data module at the particular time interval based on the availability metrics.

29. The method according to any of aspects 26-28, further comprising: assigning a priority level to each of the redundancy modules, and big data modules; and ranking the control modules, redundancy modules, and big data modules according to the assigned priority levels.

30. The method according to any of aspects 26-29, wherein the control modules, redundancy modules, and big data modules are assigned to the plurality of controllers in order of the respective rankings, wherein the highest ranked control module, redundancy module, or big data module is assigned first.

31. A computing device in a process control system, comprising: one or more processors; and a non-transitory computer-readable medium coupled to the one or more processors and storing instructions thereon, that when executed by the one or more processors, cause the computing device to: obtain a plurality of control modules that control a process in the process control system via control signals provided to field devices configured to perform physical functions within the process control system; obtain an availability metric from each of a plurality of controllers in a controller farm communicatively coupled to the plurality of field devices; and assign each of the plurality of control modules to one of the plurality of controllers to execute the respective control module at a particular time interval based on the availability metrics.

32. The computing device according to aspect 31, wherein to obtain the availability metric for one of the plurality of controllers, the instructions cause the computing device to identify the availability metric based on indications of load, bandwidth, and available memory for the controller.

33. The computing device according to either one of aspect 31 or aspect 32, wherein the instructions further cause the computing device to: assign each of one or more redundancy modules and one or more big data modules to one of the plurality of controllers to execute the respective redundancy module or big data module at the particular time interval based on the availability metrics.

34. The computing device according to any of aspects 31-33, wherein the instructions further cause the computing device to: assign a priority level to each of the control modules, redundancy modules, and big data modules; and rank the control modules, redundancy modules, and big data modules according to the assigned priority levels.

35. The computing device according to any of aspects 31-34, wherein the control modules, redundancy modules, and big data modules are assigned to the plurality of controllers in order of the respective rankings, wherein the highest ranked control module, redundancy module, or big data module is assigned first.

36. The computing device according to any of aspects 31-35, wherein the computing device is one of the plurality of controllers within the controller farm.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a controller, a control manager, a UI device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "engineer," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A process control system comprising:
a plurality of field devices each configured to perform a physical function to control at least a portion of a process in the process control system; and
a plurality of controllers in a controller farm communicatively coupled to each of the plurality of field devices and each of the plurality of controllers configured to execute control modules corresponding to the plurality of field devices to control at least a portion of the process by transmitting control signals to the plurality of field devices corresponding to the physical functions, wherein each of the plurality of controllers includes one or more of the control modules, wherein each of the plurality of controllers is selected to execute one or more of the control modules for a particular time interval of a plurality of time intervals, and wherein each of the plurality of controllers is selected to control more than one of the control modules at different time intervals of the plurality of time intervals;
wherein an indication of load, bandwidth, or available memory is obtained from each of the plurality of controllers and the one or more control modules are assigned to the plurality of controllers at periodic time intervals according to at least one of the load, bandwidth, or available memory for each controller.

2. The process control system of claim 1, wherein the controller farm is located in a temperature controlled area.

3. The process control system of claim 1, wherein the plurality of field devices is a first plurality of field devices and further comprising a second plurality of field devices, and
wherein a first controller is selected to execute a first control module corresponding to the first plurality of field devices and a second controller is selected to execute a second control module corresponding to the second plurality of field devices at the particular time interval.

4. The process control system of claim 3, wherein the first plurality of field devices and the second plurality of field devices are located within a same process plant.

5. The process control system of claim 3, wherein the first plurality of field devices and the second plurality of field devices are located within different process plants.

6. The process control system of claim 3, wherein at another time interval the first controller does not execute the first control module and the second controller executes the first control module and the second control module.

7. The process control system of claim 3, wherein the second controller executes a redundancy module corresponding to the first control module.

8. The process control system of claim 1, wherein each of the plurality of controllers in the controller farm communicate with each the plurality of field devices via an input/output (I/O) device communicatively coupled to the respective field device.

9. The process control system of claim 1, wherein the selected controller is further configured to obtain and store data corresponding to the process including at least one of: configuration data, continuous data, and event data corresponding to the process.

10. The process control system of claim 1, further comprising:
a computing device communicatively coupled to the plurality of controllers configured to assign the one or more control modules for each of the plurality of controllers to execute at the periodic time intervals.

11. The process control system of claim 10, wherein the computing device is one of the plurality of controllers within the controller farm.

12. The process control system of claim 10, wherein the computing device obtains a plurality of control modules to be executed by the plurality of controllers and ranks the plurality of control modules according to assigned priority levels.

13. The process control system of claim 12, wherein the computing devices assigns control modules to the plurality of controllers in order of the respective rankings of each of the plurality of control modules, wherein the highest ranked control module is assigned first.

14. A method for controlling a plurality of field devices in one or more process plants within a process control system via a controller farm, the method comprising:
transmitting, by a plurality of controllers in a controller farm, control signals to a plurality of field devices each configured to perform a physical function to control at least a portion of a process in the process control system, wherein each of the plurality of controllers is configured to execute control modules corresponding to the plurality of field devices to control at least a portion of the process, wherein each of the plurality of controllers includes one or more of the control modules;
selecting one of the plurality of controllers to execute one or more of the control modules for a particular time interval of a plurality of time intervals, wherein each of the plurality of controllers is selected to control more than one of the control modules at different time intervals of the plurality of time intervals, and wherein an indication of load, bandwidth, or available memory is obtained from each of the plurality of controllers and the one or more control modules are assigned to the plurality of controllers at periodic time intervals according to at least one of the load, bandwidth, or available memory for each controller; and
transmitting, by the selected controller, control signals to the plurality of field devices in accordance with the one or more control modules during the particular time interval.

15. The method of claim 14, wherein the controller farm is located in a temperature controlled area.

16. The method of claim 14, wherein the plurality of field devices is a first plurality of field devices, further comprising:
selecting a first controller to execute a first control module corresponding to the first plurality of field devices at the particular time interval;
transmitting, by the first controller, control signals to the first plurality of field devices in accordance with the first control module during the particular time interval;
selecting a second controller to execute a second control module corresponding to a second plurality of field devices at the particular time interval; and
transmitting, by the second controller, control signals to the second plurality of field devices in accordance with the second control module during the particular time interval.

17. The method of claim 16, wherein the first plurality of field devices and the second plurality of field devices are located within a same process plant.

18. The method of claim 16, wherein the first plurality of field devices and the second plurality of field devices are located within different process plants.

19. The method of claim 16, wherein at another time interval the first controller does not execute the first control module and further comprising:
transmitting, by the second controller, control signals to the first plurality of field devices in accordance with the first control module during the other time interval.

20. The method of claim 16, further comprising:
executing, by the second controller, a redundancy module corresponding to the first control module.

21. The method of claim 14, further comprising:
obtaining and storing, by the selected controller, data corresponding to the process including at least one of: configuration data, continuous data, and event data corresponding to the process.

22. The method of claim 14, wherein a computing device communicatively coupled to the plurality of controllers selects controllers to execute control modules at the periodic time intervals.

23. The method of claim 22, wherein the computing device is one of the plurality of controllers within the controller farm.

24. A method for load balancing control modules in a process control system, the method comprising:
obtaining a plurality of control modules that control at least a portion of a process in the process control system via control signals provided to field devices configured to perform physical functions within the process control system;
obtaining an availability metric from each of a plurality of controllers in a controller farm communicatively coupled to the field devices, wherein the availability metric is based on indications of load, bandwidth, or available memory for each of the plurality of controllers; and
at each of a plurality of periodic time intervals, assigning each of the plurality of control modules to one of the plurality of controllers to execute the respective control module at a particular time interval of the plurality of time intervals based on the availability metrics, wherein each of the plurality of controllers includes one or more of the control modules, and wherein each of the plurality of controllers is selected to control more than one of the control modules at different time intervals of the plurality of time intervals.

25. The method of claim 24, further comprising:
assigning each of one or more redundancy modules and one or more big data modules to one of the plurality of controllers to execute the respective redundancy module or big data module at the particular time interval based on the availability metrics.

26. The method of claim 25, further comprising:
assigning a priority level to each of the control modules, redundancy modules, and big data modules; and
ranking the control modules, redundancy modules, and big data modules according to the assigned priority levels.

27. The method of claim 26, wherein the control modules, redundancy modules, and big data modules are assigned to the plurality of controllers in order of the respective rankings, wherein the highest ranked control module, redundancy module, or big data module is assigned first.

28. A computing device in a process control system, comprising:
one or more processors; and
non-transitory computer-readable medium coupled to the one or more processors and storing instructions thereon, that when executed by the one or more processors, cause the computing device to:
obtain a plurality of control modules that control at least a portion of a process in the process control system via control signals provided to field devices configured to perform physical functions within the process control system;
obtain an availability metric from each of a plurality of controllers in a controller farm communicatively coupled to the plurality of field devices, wherein the availability metric is based on indications of load, bandwidth, or available memory for each of the plurality of controllers; and
at each of a plurality of periodic time intervals, assign each of the plurality of control modules to one of the plurality of controllers to execute the respective control module at a particular time interval of the plurality of time intervals based on the availability metrics, wherein each of the plurality of controllers includes one or more of the control modules, and wherein each of the plurality of controllers is selected to control more than one of the control modules at different time intervals of the plurality of time intervals.

29. The computing device of claim 28, wherein the instructions further cause the computing device to:
assign each of one or more redundancy modules and one or more big data modules to one of the plurality of controllers to execute the respective redundancy modules or big data module at the particular time interval based on the availability metrics.

30. The computing device of claim 29, wherein the instructions further cause the computing device to:
assign a priority level to each of the control modules, redundancy modules, and big data modules; and
rank the control modules, redundancy modules, and big data modules according to the assigned priority levels.

31. The computing device of claim 30, wherein the control modules, redundancy modules, and big data modules are assigned to the plurality of controllers in order of the respective rankings, wherein the highest ranked control module, redundancy module, or big data module is assigned first.

32. The computing device of claim 31, wherein the computing device is one of the plurality of controllers within the controller farm.

* * * * *